United States Patent
Young et al.

(10) Patent No.: US 9,787,824 B2
(45) Date of Patent: Oct. 10, 2017

(54) METHOD OF PROCESSING TELEPHONE SIGNALS AND ELECTRONIC DEVICE THEREOF

(71) Applicant: Kuo-Ping Yang, Taipei (TW)

(72) Inventors: Neo Bob Chih-Yung Young, Taipei (TW); Kuan-Li Chao, Taipei (TW); Vincent Shuang-Pung Liaw, Taipei (TW); Yun-Da Hsieh, Taipei (TW); Pao-Chuan Torng, Taipei (TW); Kuo-Ping Yang, Taipei (TW); Shu-Hua Guo, Taipei (TW)

(73) Assignee: UNLIMITED MFA CO. LTD., Eden Island (SC)

( * ) Notice: Subject to any disclaimer, the term of this patent is extended or adjusted under 35 U.S.C. 154(b) by 93 days.

(21) Appl. No.: 14/259,391

(22) Filed: Apr. 23, 2014

(65) Prior Publication Data
US 2015/0011192 A1    Jan. 8, 2015

(30) Foreign Application Priority Data
Jul. 5, 2013    (TW) .............................. 102124261 A

(51) Int. Cl.
*H04W 4/16*    (2009.01)
*H04M 1/725*    (2006.01)
*H04M 3/42*    (2006.01)
*G10L 21/0364*    (2013.01)
*G10L 25/48*    (2013.01)

(52) U.S. Cl.
CPC ..... *H04M 1/72591* (2013.01); *G10L 21/0364* (2013.01); *H04M 3/42391* (2013.01); *H04W 4/16* (2013.01); *G10L 25/48* (2013.01)

(58) Field of Classification Search
CPC .......... H04M 1/72591; H04M 3/42391; G10L 21/0364; G10L 25/48; H04W 4/16
See application file for complete search history.

(56) References Cited

U.S. PATENT DOCUMENTS

| | | | |
|---|---|---|---|
| 6,577,739 B1 * | 6/2003 | Hurtig .................. | H04R 25/353 381/106 |
| 2005/0047340 A1 * | 3/2005 | Babiarz ............... | H04L 12/2602 370/231 |
| 2012/0140964 A1 * | 6/2012 | Chao .................... | H04R 25/353 381/316 |
| 2014/0379343 A1 * | 12/2014 | Karimi-Cherkandi .. | G10L 21/02 704/246 |

* cited by examiner

*Primary Examiner* — Chuong A Ngo
(74) *Attorney, Agent, or Firm* — Bacon & Thomas, PLLC

(57) ABSTRACT

A method of processing telephone sound is disclosed. Before the telephone sound is transmitted, the frequencies of high frequency consonants are lowered. If the recipient has severe hearing impairment, the frequencies of the high frequency consonants are lowered again.

14 Claims, 8 Drawing Sheets

METHOD OF PROCESSING TELEPHONE SIGNALS AND ELECTRONIC DEVICE THEREOF

BACKGROUND OF THE INVENTION

1. Field of the Invention

The present invention relates to a method of processing telephone signals.

2. Description of the Related Art

Hearing-impaired listeners who can hear sounds with the help of hearing aid devices often have difficulty hearing high-frequency sounds. Listeners with slight hearing impairment cannot hear sounds above 6,000 Hz, and those with severe hearing impairment cannot hear sounds above 2,000 Hz. For example, listeners with severe hearing impairment cannot hear sounds above 4,000 Hz even when the sounds are amplified to several times their original volume. Since consonant sounds are often above 4,000 Hz, the basic approach of hearing aid devices is to lower the frequency of the sound and to amplify it. In addition, hearing-impaired listeners can set some adjustable parameters according to their needs. The adjustable parameters are usually related to the frequency and the amplification of sounds to facilitate the processing of the sounds by the sound-processing program (software or firmware) inside the hearing aid devices.

When a hearing-impaired listener speaks with other people face to face, common hearing aid devices are sufficient, since the devices lower or remove high-frequency sounds so that the hearing-impaired listener can hear the original high-frequency sounds. However, when the hearing-impaired listener speaks to others on a telephone, problems may arise because the phone first removes the high-frequency sounds before transmission. For example, the traditional telephone first removes frequencies above 4,000 Hz before transmission. Therefore, no sounds above 4,000 Hz are sent through telephones, and hearing-impaired listeners cannot easily identify the correct sounds on telephones as long as one side uses a traditional landline (or even 2G and 3G phones), particularly in the case of single-syllable words comprising high-frequency consonants and short vowel sounds (such as "sit") and words in monosyllabic languages such as Chinese.

When the hearing-impaired listener communicates with others on a network telephone, a problem is that some Internet phones remove frequencies above 4,000 Hz.

Thus hearing-impaired listeners are in need of help in this regard.

SUMMARY OF THE INVENTION

The main purpose of the present invention is to provide a method to help hearing-impaired listeners identify sounds more clearly when speaking on the phone.

To achieve the above-mentioned purpose, in the present invention, when the caller sends a sound to the recipient, sounds with high-frequency consonants are first processed to lower the frequency and then sent out.

When the recipient is a more severely hearing-impaired listener, sounds with high-frequency consonants are processed to lower the frequency.

In the present invention, when the telephone sound is transmitted, sounds with high-frequency consonants will be processed to lower the frequency. Particularly, when any one of two sides (the two callers on the telephone) transmits a telephone sound with a bandwidth that is not high, such as 8,000 Hz or 4,000 Hz, then the processing of the present invention can facilitate the hearing-impaired listeners to hear the sounds.

When the sound bandwidth in the phone transmission is higher, the sound cannot be processed for sending. However, when the sound is received, the sound may have to be processed, depending on the degree of hearing impairment of the recipient.

DETAILED DESCRIPTION OF THE PREFERRED EMBODIMENT

To clarify the above and other purposes, features, and advantages of this invention, a specific embodiment of this invention is especially listed and described in detail with the attached figures as follows.

Figure 1:
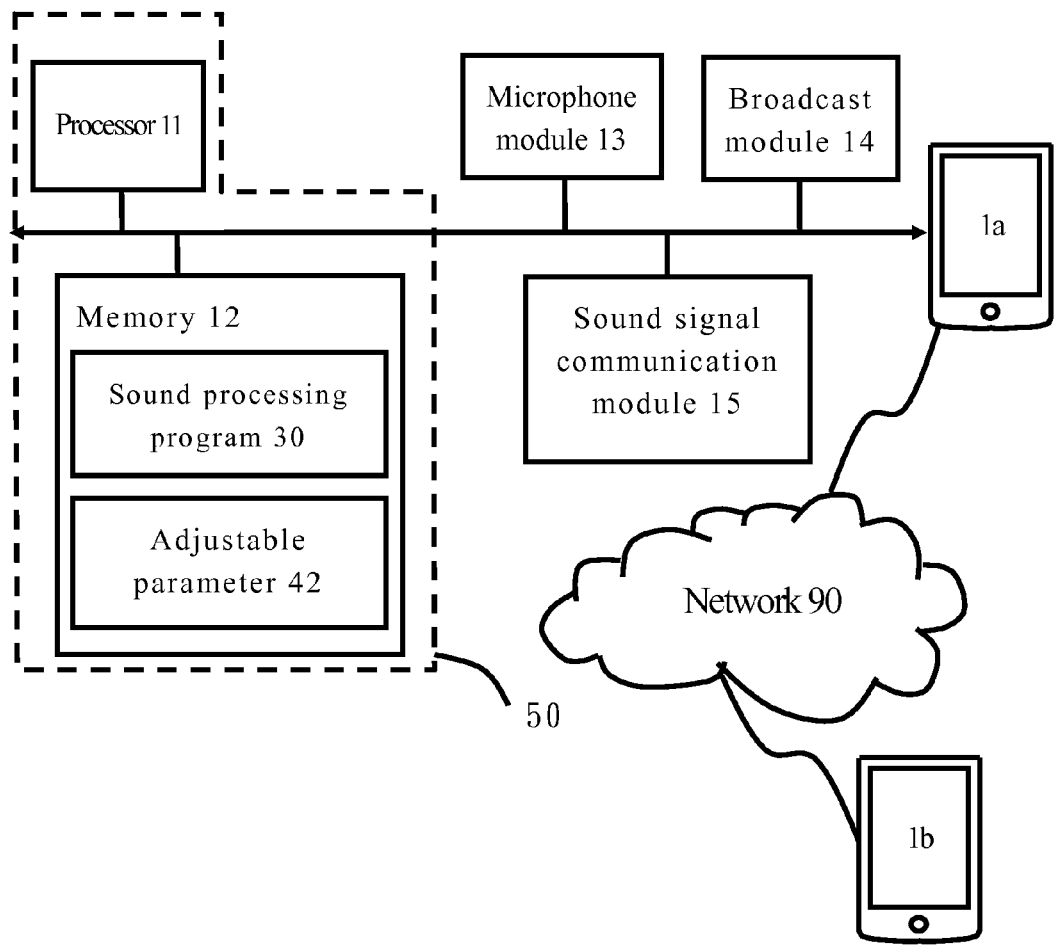
FIG. 1 is a schematic diagram of the use environment and the electronic device hardware architecture diagram of the present invention.

Please refer to FIG. 1, which is a schematic diagram of the use environment and the electronic device hardware architecture diagram of the present invention. The caller calls the recipient through an electronic device 1a, and the recipient uses the electronic device phone 1b to make a call. The network 90 includes the Internet, telecommunications, wireless networks (such as 3G, 4G, and Wi-Fi), and so on. The electronic devices 1a and 1b can be mobile phones, smart phones, computers (Internet telephony), wireless radio, and telephones. The electronic device 1a can also be a home phone (but there is a need to install the audio processing module). The present invention is especially beneficial for a caller or a recipient who has some degree of hearing impairment.

The electronic device 1a includes a processor 11, a memory 12, a microphone module 13, a broadcast module 14, and a sound signal communication module 15 (sending and receiving sound signals). The memory 12 stores a sound processing program 30 and an adjustable parameter 42. The memory 12, the microphone module 13, the broadcast module 14, and the sound signal communication module 15 are electrically connected to the processor 11.

It should be noted that, in this embodiment, the electronic devices 1a and 1b are electronic devices based on computer architecture, such as cell phones, smart phones, computers, and tablet computers. The processor 11 and the memory 12 in fact constitute the audio processing module 50. The audio processing module 50 can be designed as hardware or firmware; it need not comprise a memory 12 with a processor 11. In addition, the structure of the electronic device 1b is the same as that of the electronic device 1a, and therefore it will not be repeatedly labeled in FIG. 1.

Figure 2:
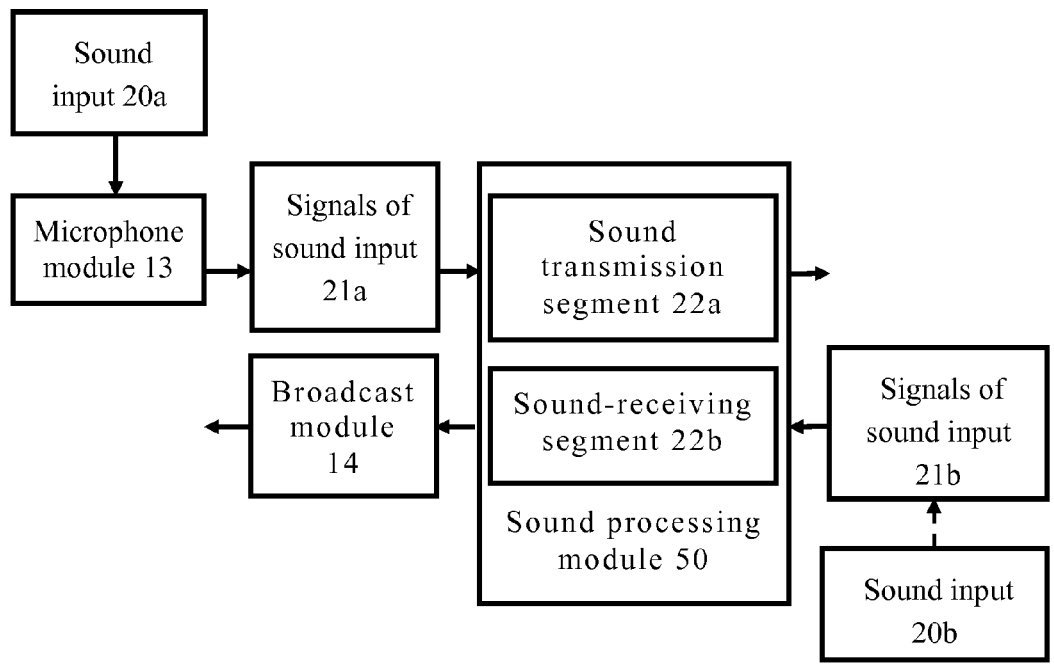
FIG. 2 is a schematic function diagram of the sound processing module of the present invention.

Please also refer to FIG. 2 in order to understand the function of the audio processing module 50. The sound input 20a of the caller is transmitted into the microphone module 13 to form the signal of the sound input 21a, and then the audio processing module 50 divides the signal of the sound input 21a into plural sound transmission segments 22a, executes the audio processing for a portion or all of the sound transmission segments 22a, and then transmits plural sound transmission segments 22a to the electronic device 1b.

The sound input 20b of the recipient (who uses the electronic device 1b) is processed through the electronic device 1b, forming the signal of the sound input 21b. The audio processing module 50 divides the signal of the sound input 21b into plural sound-receiving segments 22b. It is possible to execute audio processing on a portion or all of the sound-receiving segments 22b and then to play the sound-receiving segments 22b through the broadcast module 14.

Figure 3:
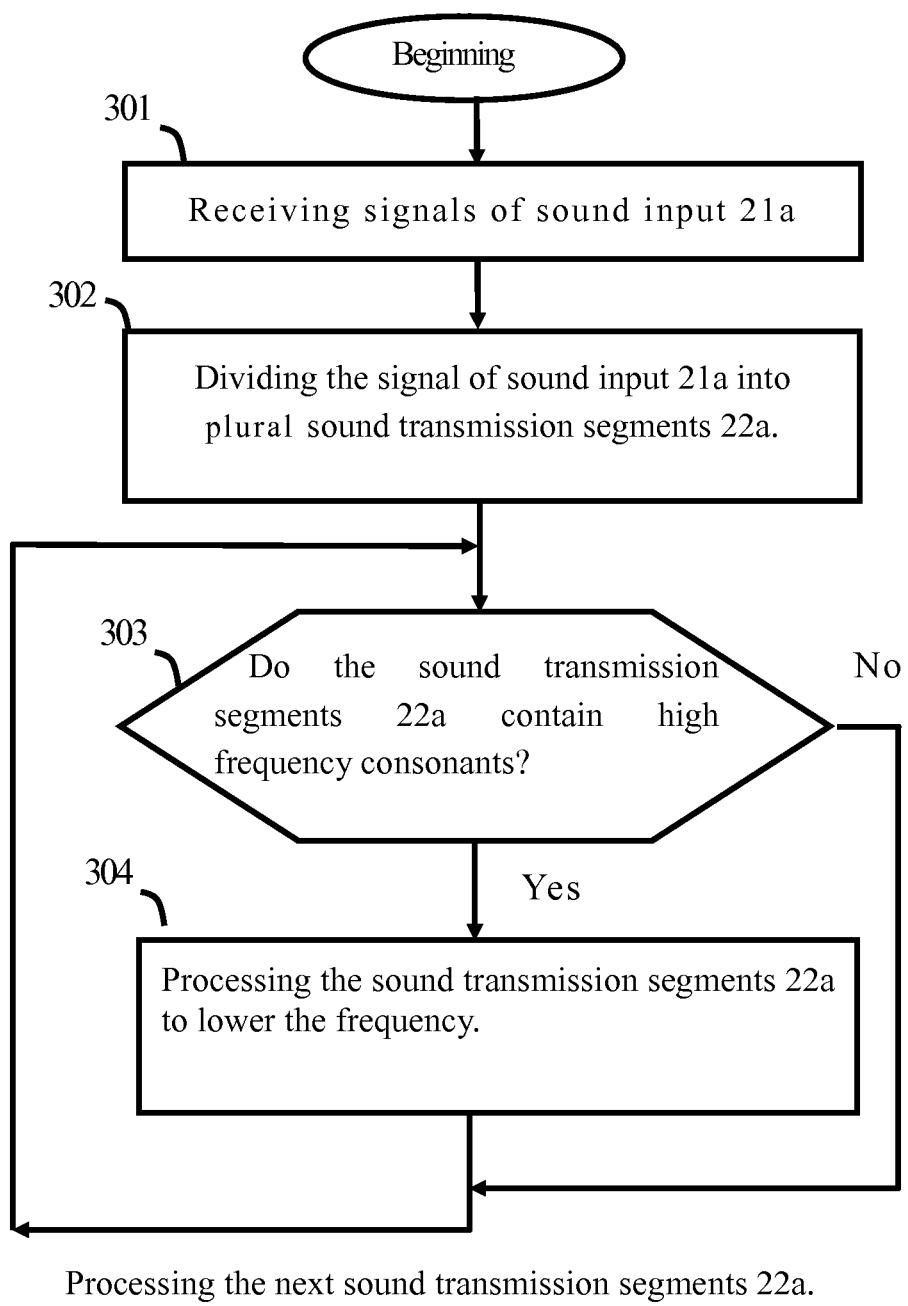
FIG. 3 is a flowchart of the sound transmission segments in the sound processing module of the present invention.
Figure 4:
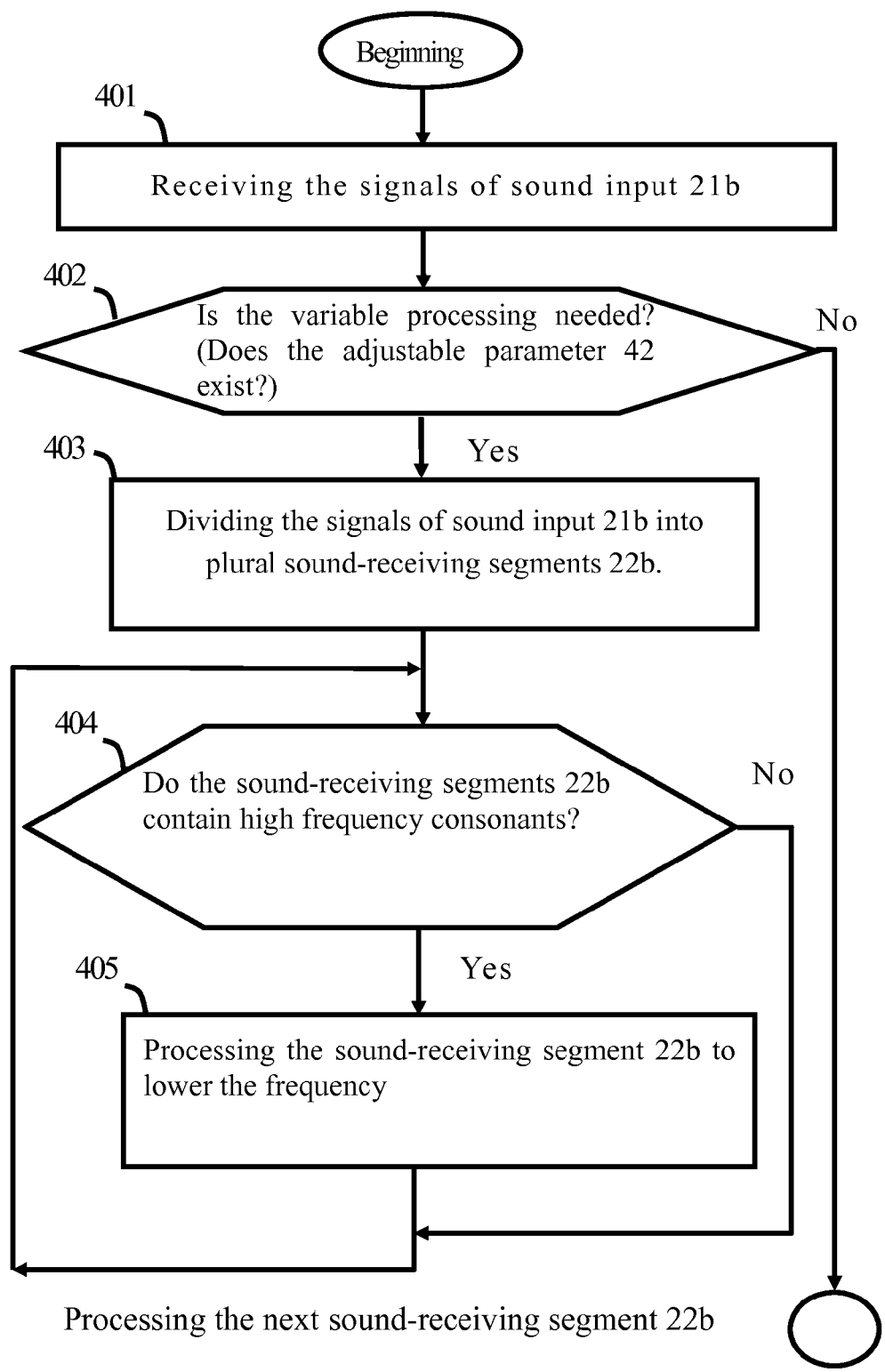
FIG. 4 is a flowchart of the sound-receiving segment in the sound processing module of the present invention.

Now please refer to FIG. 3 and FIG. 4, which present a flowchart of the sound processing of the present invention, and to FIG. 5 to FIG. 11 for a detailed understanding of the invention.

Step 301: receiving the signals of sound input 21a.

Figure 5:
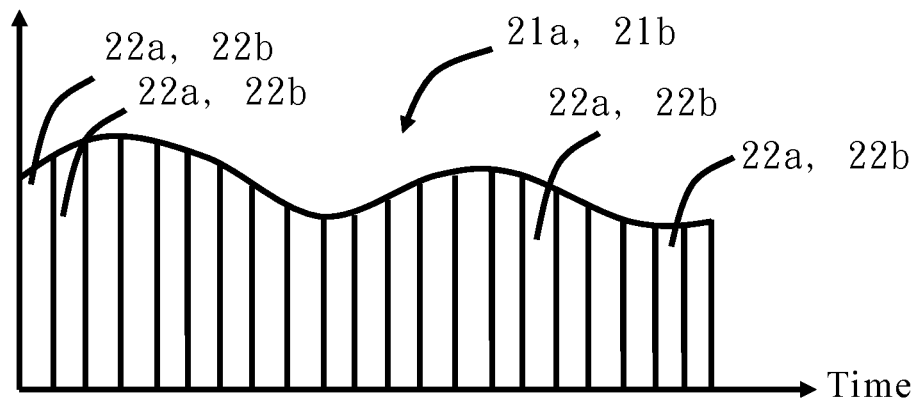
FIG. 5 is a schematic diagram of plural sound segments of the signals of sound input.

Step 302: dividing the signals of sound input 21a into plural sound transmission segments 22a, as shown in FIG. 5. The length of time for each sound segment is proposed to be 0.0001 to 0.1 seconds. In an experiment using an iPhone 4 as a hearing aid (based on the software produced and adopted in the iPhone 4 of the present invention), sound segments of 0.0001 to 0.1 second in length produced a good effect.

Step 303: Determining if the sound transmission segments 22a contain high frequency consonants. If yes, Step 304 is executed; if no, processing the next sound transmission segment 22a.

There are many methods to determine whether a sound is a high-frequency consonant or not. In the present invention, a sound is considered a high-frequency consonant when the sound transmission segments 22a have the following characteristics:

Condition I: the energy of the sound transmission segment below 1,000 Hz is less than 50% of all of the energy of the sound transmission segment; and Condition II: the energy of the sound transmission segment above 2,000 Hz is larger than 30% of all of the energy of the sound transmission segment.

A simpler way is that if a sound transmission segment above 2,500 Hz is greater than 50% of all of the energy of the sound transmission segment, it is considered a high-frequency consonant segment.

Figure 6:
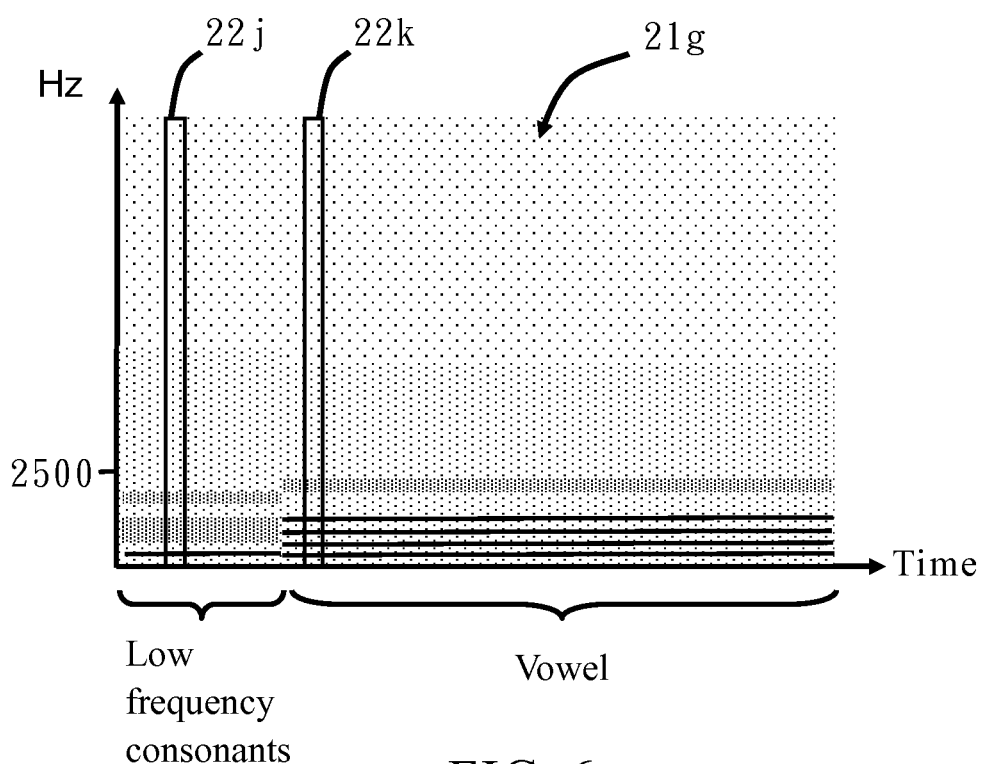
FIG. 6 is a frequency schematic diagram of the sound input with low-frequency consonants and vowels.
Figure 7:
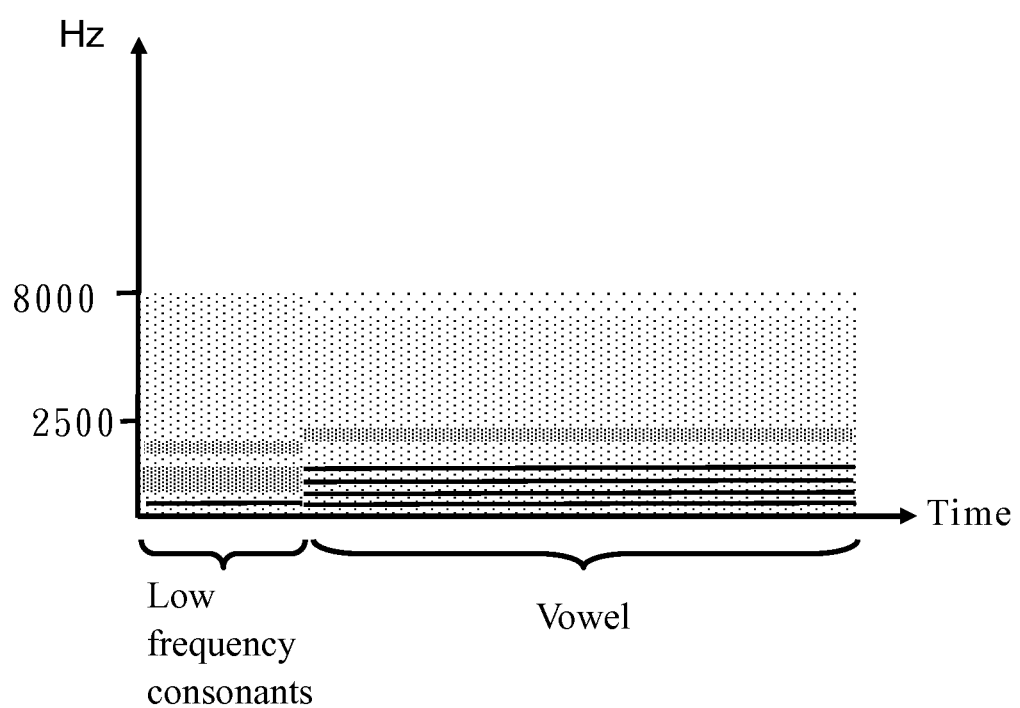
FIG. 7 is a schematic diagram of the sound transmission segments with low-frequency consonants and vowels.

Please refer to FIG. 6. The signals of the sound input 21g are, for example, "Pao" in Chinese or "Pin" in English, wherein the front section is the consonant and the back section is the vowel. The black mesh dots shown in FIG. 6 represent the energy at a frequency, and how dense the black mesh spots are represents how high the energy is. The black lines represent that the energy is concentrated at a certain frequency. For example, when the sound transmission segment 22j (the low-frequency consonant) and the sound transmission segment 22k (the vowel) do not meet the conditions, then none of the sound transmission segments of the signals of the sound input 21g meet the conditions. The signals of the sound input 21g will be sent directly to the listener without being processed. After the signals of the sound input 21g are sent out, the signals of the sound input 21g above a certain bandwidth will be cut off due to the bandwidth regulation of the telephone transmission. For example, in a Skype™ voice call, sounds above 8,000 Hz will be cut off, and in a Skype™ video call, sounds above 4,000 Hz will be cut off. Please refer to FIG. 7, which presents an example in which the signals of the sound input 21g above 8,000 Hz are cut off.

Figure 8:
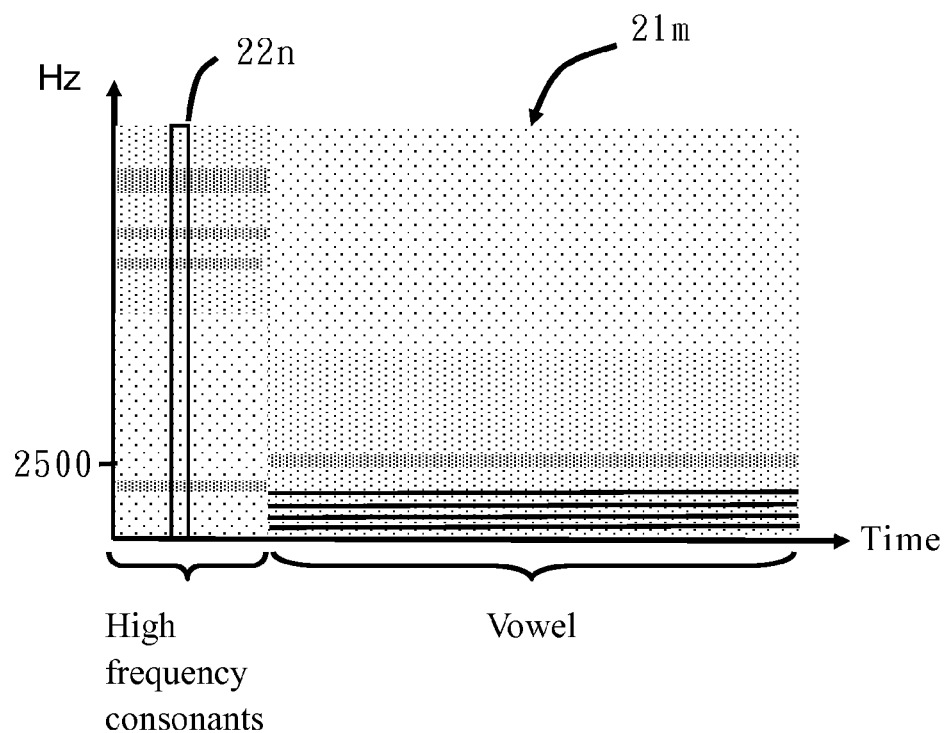
FIG. 8 is a frequency schematic diagram of the sound input with high-frequency consonants and vowels.
Figure 9:
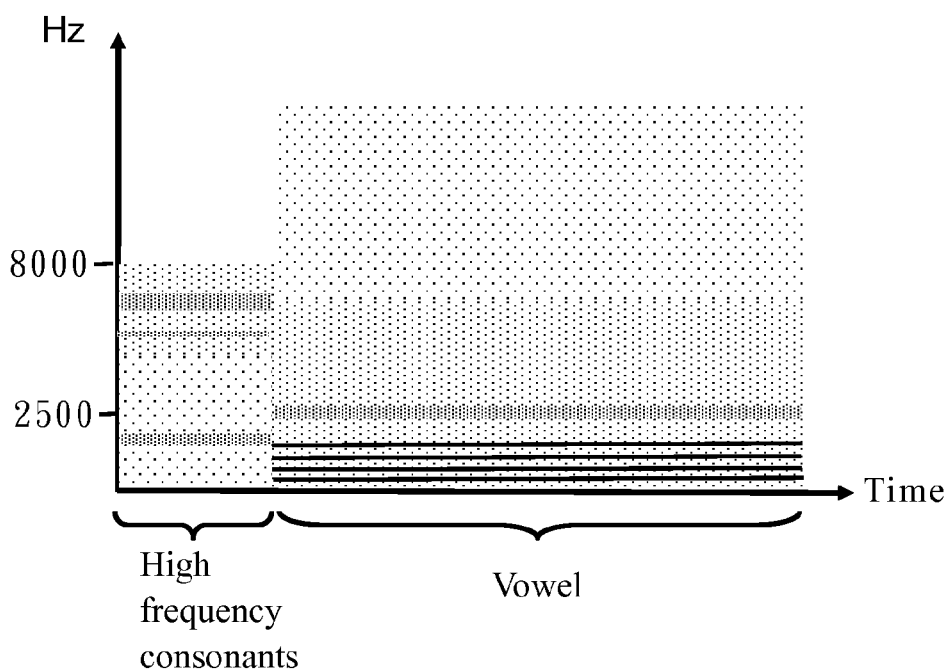
FIG. 9 is a schematic diagram of the low-frequency process of the high-frequency consonants in the sound transmission segments.
Figure 10:
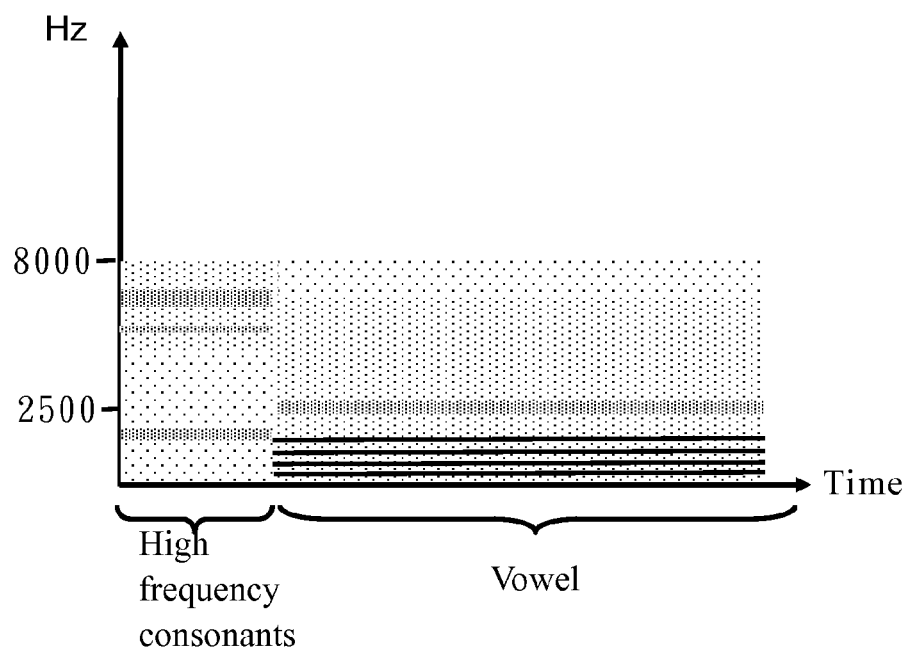
FIG. 10 is a schematic diagram of the sound transmission segments with high-frequency consonants and vowels.

Please refer to FIG. 8; when the signals of sound input 21m are, for example, "Zao" in Chinese or "see" in English, wherein the front section is the high-frequency consonant and the back section is the vowel, then if the sound transmission segment 22n meets the condition of a high-frequency consonant, Step 304 will be executed on the section of the high frequency consonants of the signals of the sound input 21m. However, Step 304 will not be executed on the vowels of the signals of the sound input 21m.

Step 304: lowering the frequency of the sound transmission segments 22a. The processing of the signals of sound input 21m is presented as an example. Please refer to FIG. 9; the high-frequency consonant in the front section is processed to lower its frequency (such as to 8 KHz or less). The frequency is lowered usually by compressing the frequency and/or shifting the frequency. For example, sounds from 6 KHz 12 KHz are compressed to 6 KHz-8 KHz, and sounds in the range of 0 KHz-6 KHz remain unchanged; or sounds from 8 KHz-12 KHz are compressed to the range of 8 KHz-10 KHz, and shifted to the range of 6 KHz-8 KHz.

The high-frequency consonant is processed to lower the frequency. In Skype™, for example, the sounds of general calls over 8,000 Hz will be cut off (as is also true in current cellphone calls). However, since high frequency consonants have important sound energy at high frequencies, high frequency sounds are lowered in frequency to prevent sound information above 8,000 Hz from being cut off. In the video calls of Skype™, for example, since sounds above 4,000 Hz are cut off (as is also true with traditional phones), high frequencies should be reduced to below 4,000 Hz. "Zhi", "chi" and "shi" in Chinese, for example, should be directly compressed from 2 KHz-8 KHz to 2 KHz-4 KHz. "Z", "c" and "s" should be compressed from 6 KHz-16 KHz to 6 KHz-8 KHz, and then shifted to 2 KHz-4 KHz. Also, "j", "q" and "x" should be compressed from 4 KHz-14 KHz to 4 KHz-6 KHz, and then shifted to 2 KHz-4 KHz. The studies of manufacturers and performances of electronic products for how to process the high-frequency consonants by lowering the frequency are different because of different languages. Since the point of the present invention is not to discuss various processes for lowering the frequency of high-frequency consonants, the processes will not be described in detail.

After the signals of the sound input 21m are sent out, the signals of the sound input 21m above a certain bandwidth will be cut off due to the bandwidth regulation of telephone transmissions. Sounds above 8,000 Hz, for example, will be cut off. Please refer to FIG. 10. The point of this invention is that sounds above 8,000 Hz (or 4,000 Hz) will be cut off, but high-frequency consonants are lowered in frequency in the present invention. Therefore, the important sound information of high-frequency consonants is preserved.

Please refer to the flowchart in FIG. 4 and FIG. 2. The flowchart in FIG. 4 explains the steps of how the audio processing module 50 processes the signals of the sound input 21b.

Step 401: receiving signals of the sound input 21b.

Step 402: determining if audio processing 42 is needed. If the adjustable parameter 42 does not exist, then the audio processing module 50 no longer processes the signals of sound input 21b. If the adjustable parameter 42 exists, the hearing-impaired level of the hearing-impaired listeners is mild, and the bandwidth of the signals of sound input 21b is wide enough, the processing will not be executed. For example, the frequency between 0 KHz-4 KHz is audible to the hearing-impaired listeners, but the frequency above 4 KHz is inaudible; if the signals of sound input 21b are between 0 KHz-4 KHz, the processing will not be executed; but if the signals of sound input 21b are between 0 KHz-8 KHz, Step 403 will be executed.

The adjustable parameter 42 records the hearing information (for example, sounds above 4,000 HZ are difficult to hear) of the hearing-impaired listeners (including the elderly with hearing loss) or how the sound should be changed to improve audibility, such as amplification parameters, hearing parameters (like the hearing ability parameters of hearing-impaired listeners), or the frequency-variable parameter (such as the frequency-compressing parameter or frequency-shifting parameter). Because it is a well-known art to control the output of audio processing via the adjustable parameter 42 (hearing aid technology), then it will not be described in detail. It should be noted that the adjustable parameter 42 might also be an audiogram. The software program can perform calculations and determine how to change the sound based on the audiogram.

Step 403: dividing the signals of sound input 21b into plural sound-receiving segments 22b.

Step 404: determining if the sound-receiving segments 22b contain high frequency consonants. In this step, Step 303 can be referred to. If yes, Step 405 is executed; if not, the next sound-receiving segment 22b is processed.

Figure 11:
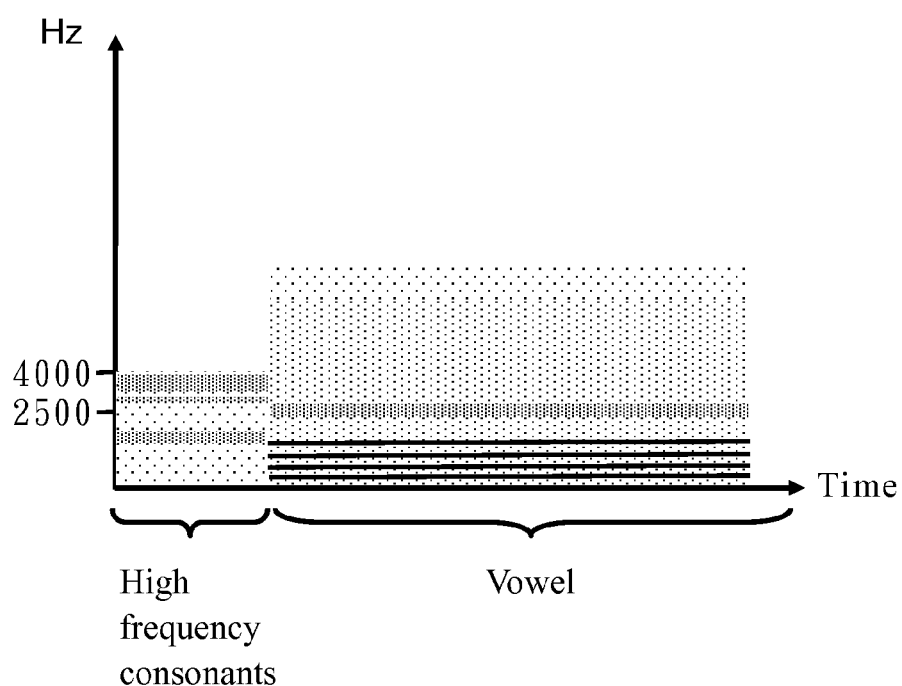
FIG. 11 is a schematic diagram of the low-frequency process of the high-frequency consonants in the sound-receiving segments.

Step 405: Lowering the frequency of the sound-receiving segment 22b. For example, in FIG. 10, the signals of the sound input 21b have all been processed to below 8,000 Hz. However, since the sounds with high frequency consonants exist and the hearing-impaired listeners can only hear 0 KHz-4 KHz, the sound with high frequency consonants is processed to lower the frequency. The results of the processing are shown in FIG. 11. The part of the sound with a high-frequency consonant is processed to below 4 KHz. Basically, the vowels will not be processed (e.g., being reduced to below 4 KHz) in the invention. Because the energy of the vowels above 4 KHz is not large, the effect of the sound output will not be good if the frequency of vowels in the 4 KHz-8 KHz range is lowered or removed.

It should be noted that, although a few exemplary embodiments of the present invention have been shown and described, the present invention is not limited to the described exemplary embodiments. Instead, it will be appreciated by those skilled in the art that changes may be made to these exemplary embodiments without departing from the principles and spirit of the invention, the scope of which is defined by the claims and their equivalents. Steps 301-304 and Steps 401-405 do not necessarily have to exist at the same time. As long as one of the steps is processed, it belongs to the feature of the present invention. When the bandwidth of the transmission sound of any one of both sides (the two users communicating with each other) is not high, Steps 301-304 are required. Steps 401-405 are applicable to processing for hearing-impaired listeners.

What is claimed is:

1. A method of processing telephone sounds for a user using a phone, the method comprising:
   in a case of transmitting the telephone sounds from the phone:
      receiving a sound transmission segment from a signal of a sound input into a microphone module of the phone; and
      determining whether the sound transmission segment has high frequency consonants using an audio processing module of the phone;
      wherein if the sound transmission segment has the high frequency consonants, compressing and/or shifting the frequency of the sound transmission segment and then transmitting the sound transmission segment to another phone; and
      if the sound transmission segment does not have the high frequency consonants, then transmitting the sound transmission segment directly to another phone.

2. The method of processing telephone sound as claimed in claim 1, wherein the method further comprises:
   in a case of receiving a sound input from another phone:
      receiving a sound-receiving segment from a signal of the sound input from the other phone; and
      determining whether the sound-receiving segment has high frequency consonants;
      wherein if the sound-receiving segment has the high frequency consonants, lowering the frequency of the sound-receiving segment and then outputting the sound-receiving segment; and
      if the sound-receiving segment does not have the high frequency consonants, then outputting the sound-receiving segment directly.

3. The method of processing telephone sound as claimed in claim 2, wherein the frequency of the sound-receiving segment is lowered based on an adjustable parameter that reflects the hearing status of the user.

4. The method of processing telephone sound as claimed in claim 3, wherein the frequency of the sound-receiving segment is lowered based on a telephone bandwidth.

5. The method of processing telephone sound as claimed in claim 4, wherein a sound segment is determined to have high frequency consonants if the sound transmission segment has the following characteristics:
   the energy of the sound transmission segment below 1,000 Hz is less than 50% of all of the energy of the sound transmission segment; and
   the energy of the sound transmission segment above 2,000 Hz is greater than 30% of all of the energy of the sound transmission segment.

6. The method of processing telephone sound as claimed in claim 5, wherein a sound segment is determined to have high frequency consonants if the sound-receiving segment has the following characteristics:
   the energy of the sound transmission segment below 1,000 Hz is less than 50% of all of the energy of the sound transmission segment; and
   the energy of the sound transmission segment above 2,000 Hz is greater than 30% of all of the energy of the sound transmission segment.

7. The method of processing telephone sound as claimed in claim 1, wherein a sound segment is determined to have high frequency consonants if the sound transmission segment has the following characteristics:
  the energy of the sound transmission segment below 1,000 Hz is less than 50% of all of the energy of the sound transmission segment; and
  the energy of the sound transmission segment above 2,000 Hz is greater than 30% of all of the energy of the sound transmission segment.

8. An electronic device, comprising a processor, a memory, a microphone module, and a broadcast module, wherein the memory, the microphone module, and the broadcast module are electrically connected to the processor, and the memory comprises a software program, and the processor operative with the software program to perform the steps of:
  in a case of receiving the sound from another phone;
    receiving a sound-receiving segment from a signal of a sound input from another phone; and
    determining whether the sound-receiving segment has high frequency consonants;
    wherein if the sound-receiving segment has the high frequency consonants, compressing and/or shifting the frequency of the sound-receiving segment and then outputting the sound-receiving segment; and
    if the sound-receiving segment does not have the high frequency consonants, outputting the sound-receiving segment directly,
  in which the processor is further operative with the software program to perform the step of:
  in a case of transmitting the sound:
    receiving a sound transmission segment from a signal of a sound input into the phone; and
    determining whether the sound transmission segment has high frequency consonants;
    wherein if the sound transmission segment has the high frequency consonants, lowering the frequency of the sound transmission segment and then outputting the sound transmission segment; and
    if the sound transmission segment does not have the high frequency consonants, outputting the sound transmission segment directly.

9. The electronic device as claimed in claim 8, wherein the frequency of the sound-receiving segment is lowered based on an adjustable parameter that reflects the hearing status of the user.

10. The electronic device as claimed in claim 9, wherein the frequency of the sound-receiving segment is lowered based on a telephone bandwidth.

11. The electronic device as claimed in claim 10, wherein a sound segment is determined to have high frequency consonants if the sound-receiving segment has the following characteristics:
  the energy of the sound transmission segment below 1,000 Hz is less than 50% of all of the energy of the sound transmission segment; and
  the energy of the sound transmission segment above 2,000 Hz is greater than 30% of all of the energy of the sound transmission segment.

12. The electronic device as claimed in claim 11, wherein a sound segment is determined to have high frequency consonants if the sound transmission segment has the following characteristics:
  the energy of the sound transmission segment below 1,000 Hz is less than 50% of all of the energy of the sound transmission segment; and
  the energy of the sound transmission segment above 2,000 Hz is greater than 30% of all of the energy of the sound transmission segment.

13. The electronic device as claimed in claim 8, wherein a sound segment is determined to have high frequency consonants if the sound transmission segment has the following characteristics:
  the energy of the sound transmission segment below 1,000 Hz is less than 50% of all of the energy of the sound transmission segment; and
  the energy of the sound transmission segment above 2,000 Hz is greater than 30% of all of the energy of the sound transmission segment.

14. A method of processing telephone sounds for a user using a phone, the method comprising:
  in a case of transmitting the telephone sounds from the phone:
    receiving a sound transmission segment from a signal of a sound input into a microphone module of the phone; and
    determining whether the sound transmission segment has high frequency consonants using an audio processing module of the phone;
    wherein if the sound transmission segment has the high frequency consonants, compressing the frequency of the sound transmission segment and then transmitting the sound transmission segment to another phone; and
    if the sound transmission segment does not have the high frequency consonants, then transmitting the sound transmission segment directly to another phone.

* * * * *